(12) United States Patent
Prunier

(10) Patent No.: US 12,026,512 B2
(45) Date of Patent: Jul. 2, 2024

(54) MICROSERVICE DATA ITEM STORAGE AND RETRIEVAL USING GENERATION-BASED CACHE

(71) Applicant: EMC IP Holding Company LLC, Hopkinton, MA (US)

(72) Inventor: Dominique Prunier, Montreal (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 202 days.

(21) Appl. No.: 16/810,169

(22) Filed: Mar. 5, 2020

(65) Prior Publication Data

US 2021/0279057 A1 Sep. 9, 2021

(51) Int. Cl.
| | |
|---|---|
| *G06F 12/0808* | (2016.01) |
| *G06F 9/30* | (2018.01) |
| *G06F 9/32* | (2018.01) |
| *G06F 9/38* | (2018.01) |
| *G06F 9/54* | (2006.01) |

(52) U.S. Cl.
CPC .......... *G06F 9/30047* (2013.01); *G06F 9/321* (2013.01); *G06F 9/3856* (2023.08); *G06F 9/546* (2013.01); *G06F 12/0808* (2013.01)

(58) Field of Classification Search
None
See application file for complete search history.

(56) References Cited

U.S. PATENT DOCUMENTS

| | | | | |
|---|---|---|---|---|
| 10,924,334 B1 * | 2/2021 | Kumar | .................... | H04L 67/55 |
| 2015/0237135 A1 * | 8/2015 | Venkat | .................. | G06F 3/0619 |
| | | | | 709/214 |

FOREIGN PATENT DOCUMENTS

CN  110661662 A  *  1/2020  ............... G06F 8/71

OTHER PUBLICATIONS

Krishnaswamy et al. "Enabling Interactive Applications over the Internet." 1999. Georgia Institute of Technology, College of Computing. Tech Report.*
Rafal Leszko. "Where is My Cache? Architectural Patterns for Caching Microservices." Sep. 2019. https://hazelcast.com/blog/architectural-patterns-for-caching-microservices/.*

(Continued)

*Primary Examiner* — Nathan Sadler
(74) *Attorney, Agent, or Firm* — Ryan, Mason & Lewis, LLP

(57) ABSTRACT

Techniques are provided for microservice configuration information retrieval and storage using a generation-based cache. One method comprises obtaining, by a first microservice, a data item from a second microservice with a corresponding generation counter; maintaining, by the first microservice, the data item in a cache with the corresponding generation counter; invalidating, by the first microservice, one or more entries in the cache having a lower generation counter value than a current generation counter; and in response to a request for the data item, performing, by the first microservice: processing the requested data item, if the requested data item is in the cache after the invalidation; and if the requested data item is not in the cache after the invalidation: (i) retrieving the requested data item from the second microservice, (ii) processing the retrieved data item and (iii) placing the retrieved requested data item in the cache with a corresponding generation counter value.

20 Claims, 5 Drawing Sheets

(56) References Cited

OTHER PUBLICATIONS

Translation of CN-110661662-A. 2022.*
Ashok Kamthane. Object-Oriented Programming with ANSI and Turbo C++. 2003. Pearson Education. Sections 6.1-6.5, 9.13, 14.17.*
Eberhard et al. "Efficient Object Caching for Distributed Java RMI Applications." Oct. 2001. Springer. Middleware 2001. pp. 15-35.*
Pelkonen et al., "Gorilla: A Fast, Scalable, In-Memory Time Series Database", Proceedings of the VLDB Endowment, vol. 8, No. 12 (2015).
"Schema Design for Time Series Data", Cloud Bigtable Documentation, downloaded from https://cloud.google.com/bigtable/docs/schema-design-time-series on Mar. 4, 2020.
Walters, Robert, "Time Series Data and MongoDB: Part 2—Schema Design Best Practices", downloaded from https://www.mongodb.com/blog/post/time-series-data-and-mongodb-part-2-schema-design-best-practices on Mar. 4, 2020.

* cited by examiner

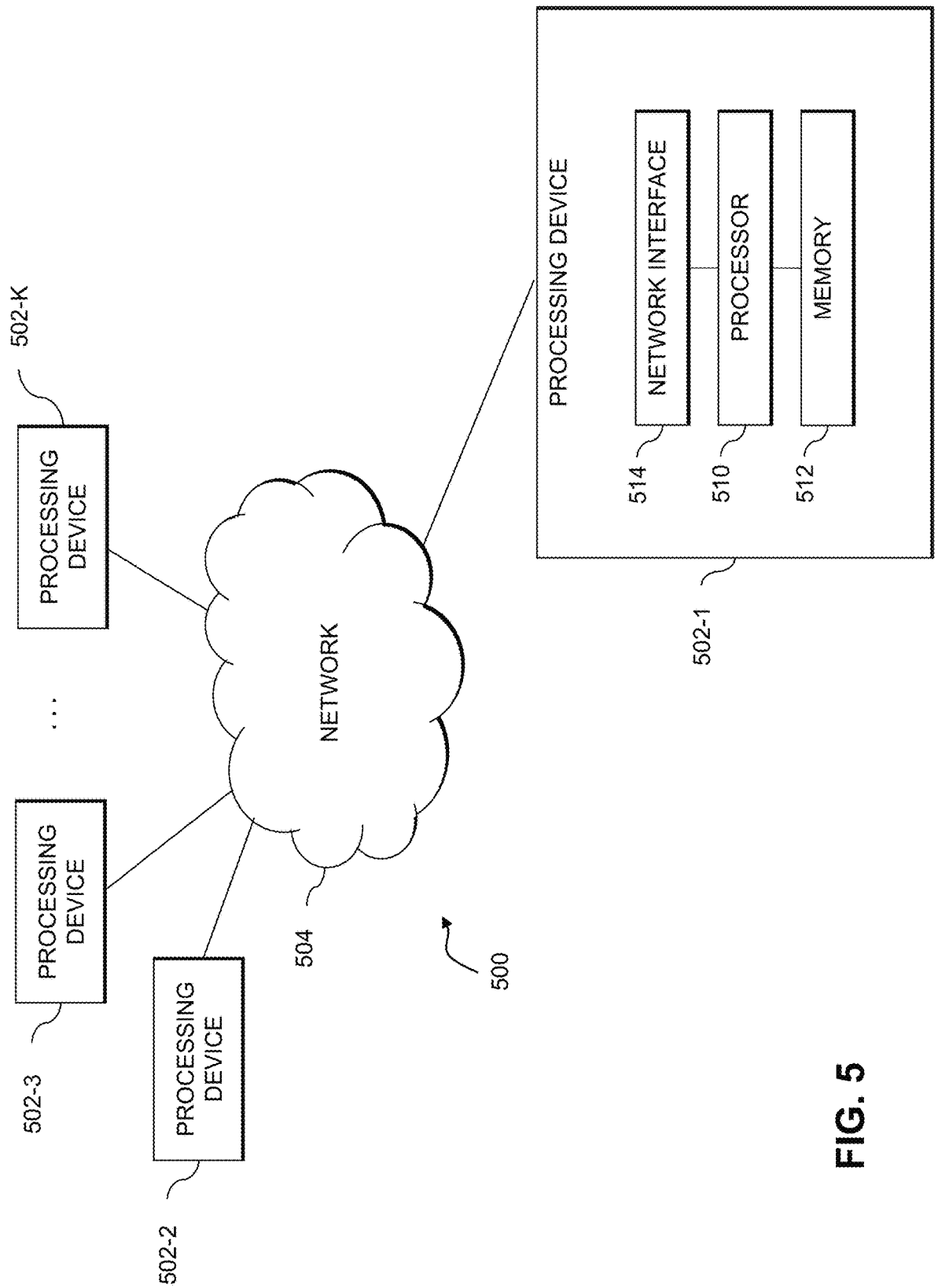

MICROSERVICE DATA ITEM STORAGE AND RETRIEVAL USING GENERATION-BASED CACHE

FIELD

The field relates generally to information processing systems, and more particularly to techniques for storing and retrieving information in such information processing systems.

BACKGROUND

A number of best practices have been defined for microservice architectures. For example, one best practice suggests that a database should be accessed by only a single microservice (and not shared, for example, across multiple microservices) and another best practice suggests that a microservice should have a limited scope and/or limited responsibilities, executing smaller tasks within a fairly contained domain.

As a result, in some systems, a set of microservices is fairly common, where one microservice (often referred to as a "configuration microservice") manages some configuration items, for example, that another microservice (often referred to as a "consumer microservice") needs to do its tasks. A need exists for improved techniques for storing and retrieving data items, such as configuration data items, in a microservice environment.

SUMMARY

In one embodiment, a method comprises obtaining, by a first microservice, at least one data item from a second microservice with a corresponding generation counter; maintaining, by the first microservice, the at least one data item in a cache with the corresponding generation counter; invalidating, by the first microservice, one or more entries in the cache having a lower generation counter value than a current generation counter; and in response to a request for the at least one data item, performing the following steps, by the first microservice: processing the requested at least one data item, if the requested at least one data item is in the cache after the invalidation; and if the requested at least one data item is not in the cache after the invalidation: (i) retrieving the requested at least one data item from the second microservice, (ii) processing the retrieved at least one data item and (iii) placing the retrieved at least one requested data item in the cache with a corresponding generation counter value.

In some embodiments, the second microservice increments the generation counter for each update to a data item within a grouping of data items comprising the at least one data item, and the invalidating the one or more entries in the cache having the lower generation counter value than the current generation counter comprises invalidating data items within the grouping of data items comprising the at least one data item.

Other illustrative embodiments include, without limitation, apparatus, systems, methods and computer program products comprising processor-readable storage media.

BRIEF DESCRIPTION OF THE DRAWINGS

FIG. 5 illustrates another exemplary processing platform that may be used to implement at least a portion of one or more embodiments of the disclosure.

DETAILED DESCRIPTION

Figure 1:
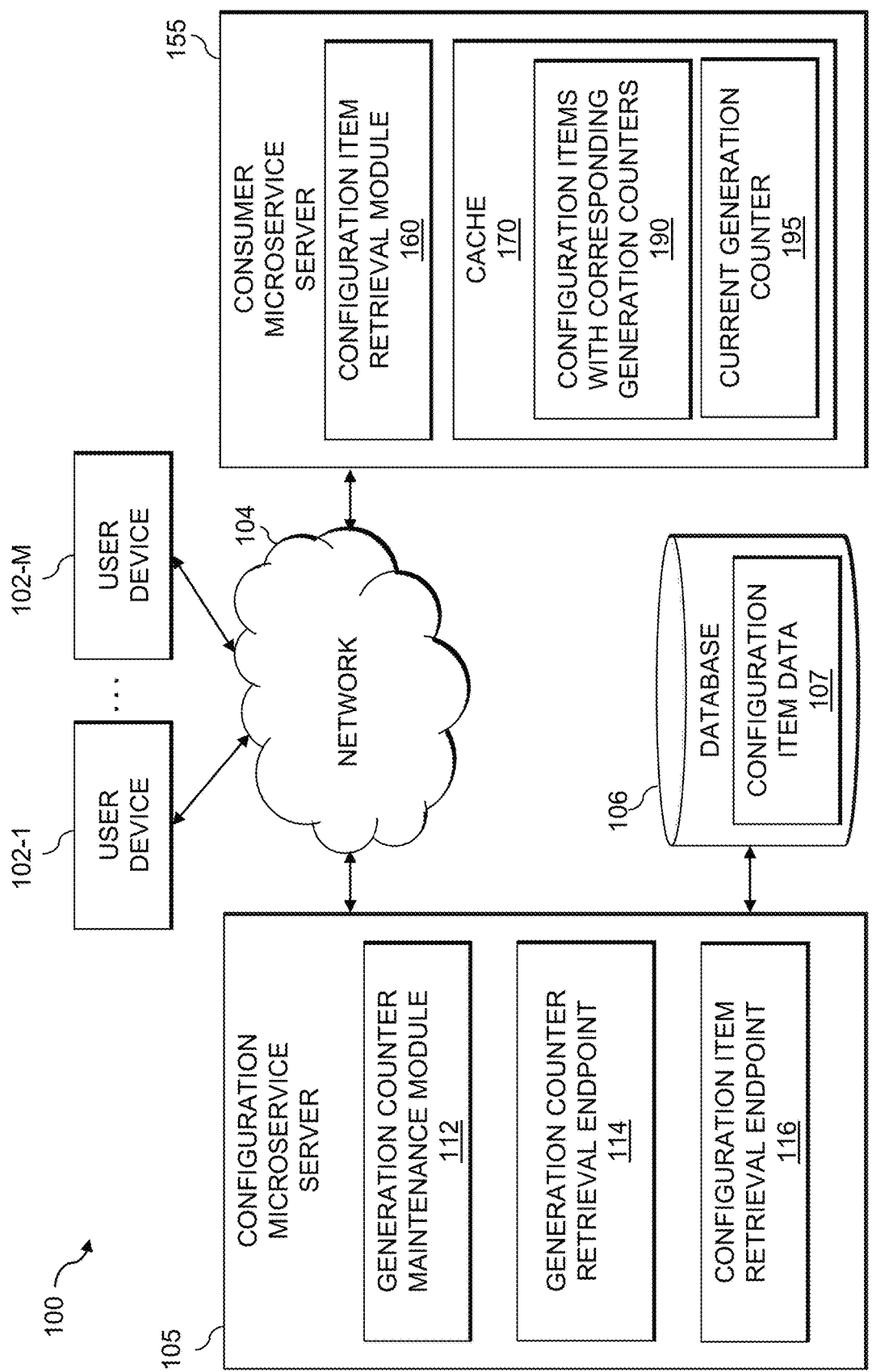
FIG. 1 shows an information processing system configured for microservice configuration information retrieval and storage in an illustrative embodiment.

Illustrative embodiments of the present disclosure will be described herein with reference to exemplary computer networks and associated computers, servers, network devices or other types of processing devices. It is to be appreciated, however, that the disclosure is not restricted to use with the particular illustrative network and device configurations shown. Accordingly, the term "computer network" as used herein is intended to be broadly construed, so as to encompass, for example, any system comprising multiple networked processing devices.

When a consumer microservice needs a configuration item, the consumer microservice typically issues a remote call to the configuration microservice (e.g., a REST HTTP (Representational State Transfer Hypertext Transfer Protocol) call) to retrieve them. For performance reasons and to limit the number of remote calls, the retrieved configuration items may be cached by the consumer microservice, for example, when the retrieved configuration items change infrequently.

One or more embodiments of the disclosure provide methods, apparatus and computer program products for microservice information storage and retrieval using a generation-based cache. In some embodiments, a generation counter is returned to a requesting consumer microservice with a retrieved data item. The generation counter is an increasing sequence that is incremented any time a data item is updated. In some embodiments, the generation counter is incremented for each update to one or more configuration items in a related subset of data items. Thus, as used herein, the term "generation" shall be broadly construed to encompass, for example, those data items in a related subset of data items. In one or more embodiments, entries in a cache are invalidated based on a comparison of the generation counter value for the related subset of data items relative to a current generation counter value.

As used herein, the term "data item" shall be broadly construed to encompass, for example, a generic data value (such as a key-value pair) that has a name (or another identifier) and a value. For example, a data item for a visual application may comprise "color=green," where "color" is the name and "green" is the value. In further variations, values can be more complex (such as, for example, objects and lists), but the particular nature of the value is outside of the scope of the present disclosure. While one or more exemplary embodiments are described in the context of a storage and retrieval of configuration items, the configuration items are an example of the storage and retrieval of any such data items, as would be apparent to a person of ordinary skill in the art.

One or more aspects of the present disclosure recognize that when the data items become fairly numerous and/or large, frequent retrieval of the data items (to guarantee reasonable freshness) can become costly by producing numerous communication exchanges between entities. In addition, the frequent retrieval of the data items dramatically reduces the effectiveness of the cache by limiting the opportunity to experience a cache hit.

One or more embodiments of the disclosure provide a generation-based cache for storing and retrieving data items in a microservice environment. Among other benefits, the disclosed generation-based cache enables a lightweight mechanism (e.g., characterized by a low usage of system resources, such as a small memory footprint and/or a low processor usage, and reduces communication exchanges between entities) for providing reasonable freshness while improving cache effectiveness (relative to conventional techniques, for example) by preventing early and/or artificial invalidation of cached data items.

As used herein, a microservice is a software development architecture that structures a software application as a set of coupled services, wherein each service runs a distinct process.

FIG. 1 shows a computer network (also referred to herein as an information processing system) 100 configured in accordance with an illustrative embodiment. The computer network 100 comprises a plurality of user devices 102-1, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

Also coupled to network 104 is a configuration microservice server 105 and a consumer microservice server 155, discussed further below. As noted above, a configuration microservice typically manages configuration items needed by a consumer microservice to do its tasks. In the case of storage and retrieval of more generic data items, the configuration microservice may be more generally referred to as a supplier microservice that manages data items needed by a consumer microservice to do its tasks.

As noted above, the generation counter is an increasing sequence that is incremented any time a data item is updated. It is noted that there might be more than one generation counter if there are multiple subsets (or groups) of data items that are subject to change at different frequencies.

The exemplary configuration microservice server 105 of FIG. 1 comprises a generation counter maintenance module 112, a generation counter retrieval endpoint 114 and a configuration item retrieval endpoint 116. As discussed hereinafter, the exemplary generation counter maintenance module 112 maintains a generation counter that is incremented, at least in some embodiments, for each update to one or more configuration items in a subset of configuration items. The exemplary generation counter retrieval endpoint 114 returns generation counters to consumer microservices (e.g., for cache eviction evaluation). The exemplary configuration item retrieval endpoint 116 returns requested configuration items (or more generic data items) with the corresponding generation counter value to the requesting consumer microservice server 155 (e.g., by attaching the generation counter value with returned configuration items).

Additionally, the configuration microservice server 105 can have an associated database 106 configured to store configuration item data 107 (or more generic data items) pertaining to configuration item information needed by one or more consumer microservice servers 155, etc.

The database 106 in the present embodiment is implemented using one or more storage systems associated with the configuration microservice server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

The exemplary consumer microservice server 155 of FIG. 1 comprises a configuration item retrieval module 160 and a cache 170. As shown in FIG. 1, the cache 170 comprises retrieved configuration items (or more generic retrieved data items) and corresponding generation counters 190 (obtained, for example, by the configuration item retrieval module 160 from the configuration item retrieval endpoint 116) and a value of a current generation counter 195 (provided, for example, by the generation counter retrieval endpoint 114).

It is to be appreciated that this particular arrangement of modules 112, and endpoints 114 and 116 illustrated in the configuration microservice server 105 and the configuration item retrieval module 160 in the consumer microservice server 155 of the FIG. 1 embodiment is presented by way of example only, and alternative arrangements can be used in other embodiments. For example, the functionality associated with modules 112, and endpoints 114 and 116 in other embodiments can be combined into a single processing entity, or separated across a larger number of processing entities. In addition, the functionality associated with module 160 can be separated across a number of processing entities. As another example, multiple distinct processors can be used to implement different ones of modules 112, 160 and endpoints 114 and 116 or portions thereof. At least portions of modules 112, 160 and endpoints 114 and 116 may be implemented at least in part in the form of software that is stored in memory and executed by a processor.

The user devices 102 may comprise, for example, computing devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the configuration microservice server 105 and/or the consumer microservice server 155 can be one or more input-output devices, which illustratively comprise keyboards, displays or other types of input-output devices in any combination. Such input-output devices can be used, for example, to support one or more user interfaces to the configuration microservice server 105 and/or the consumer microservice server 155, as well as to support communication between the configuration microservice server 105 (and/or the consumer microservice server 155) and other related systems and devices not explicitly shown.

The user devices 102 and the configuration microservice server 105 and/or the consumer microservice server 155 in the FIG. 1 embodiment are assumed to be implemented using at least one processing device. Each such processing device generally comprises at least one processor and an associated memory, and implements one or more functional modules for controlling certain features of the configuration microservice server 105.

More particularly, user devices 102, configuration microservice server 105 and/or the consumer microservice server 155 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the user devices 102, the configuration microservice server 105 and/or the consumer microservice server 155 to communicate over the network 104 with each other (as well as one or more other networked devices), and illustratively comprises one or more conventional transceivers.

It is to be understood that the particular set of elements shown in FIG. 1 for microservice configuration information retrieval and storage is presented by way of illustrative example only, and in other embodiments additional or alternative elements may be used. Thus, another embodiment includes additional or alternative systems, devices and other network entities, as well as different arrangements of modules and other components.

It is noted that while the exemplary configuration microservice and consumer microservice of FIG. 1 execute on respective servers 105, 155 (typically as a virtual layer through Infrastructure as a Service (IaaS) or Platform as a Service (PaaS)), other implementations are possible, as would be apparent to a person of ordinary skill in the art. In addition, while the exemplary configuration microservice server 105 and consumer microservice server 155 communicate with each other over network 104 (e.g., in a cloud or local data center), local communications between the servers 105, 155 are also within the scope of the present disclosure.

An exemplary process utilizing modules 112, 160 and/or endpoints 114 and 116 of the exemplary configuration microservice server 105 or consumer microservice server 155 in computer network 100 will be described in more detail with reference to FIGS. 2 and 3.

As noted above, the exemplary configuration microservice server 105 maintains an associated database 106 configured to store configuration item data 107 pertaining to configuration item information needed by one or more consumer microservice servers 155, etc. The exemplary generation counter maintenance module 112 maintains a generation counter that is incremented, at least in some embodiments, for each update to one or more configuration items in a subset of configuration items. The exemplary generation counter retrieval endpoint 114 returns generation counters to consumer microservices (e.g., for cache eviction evaluation). The exemplary configuration item retrieval endpoint 116 returns requested configuration items with the corresponding generation counter value to the requesting consumer microservice server 155 (e.g., by attaching the generation counter value with returned configuration items).

As also noted above, the exemplary consumer microservice server 155 employs the configuration item retrieval module 160 to implement, for example, functionality described below in conjunction with FIGS. 2 and 3. The exemplary consumer microservice server 155 also comprises a cache 170 for caching (i) configuration items and corresponding generation counters 190 provided, at least in some embodiments, by the configuration item retrieval endpoint 116 upon retrieval of a particular configuration item; and (ii) the current generation counter 195 (the current generation counter 195 may also be stored in some embodiments in regular memory or on disk). Thus, the configuration item retrieval module 160 attaches the generation counter value in the cache 170 with returned configuration items. In at least some embodiments, the cache 170 retains an arbitrary (bounded or unbounded) amount of configuration items along with the corresponding generation counter value that was returned by the configuration item retrieval endpoint 116 of the configuration microservice server 105 when the configuration item was retrieved.

Figure 2:
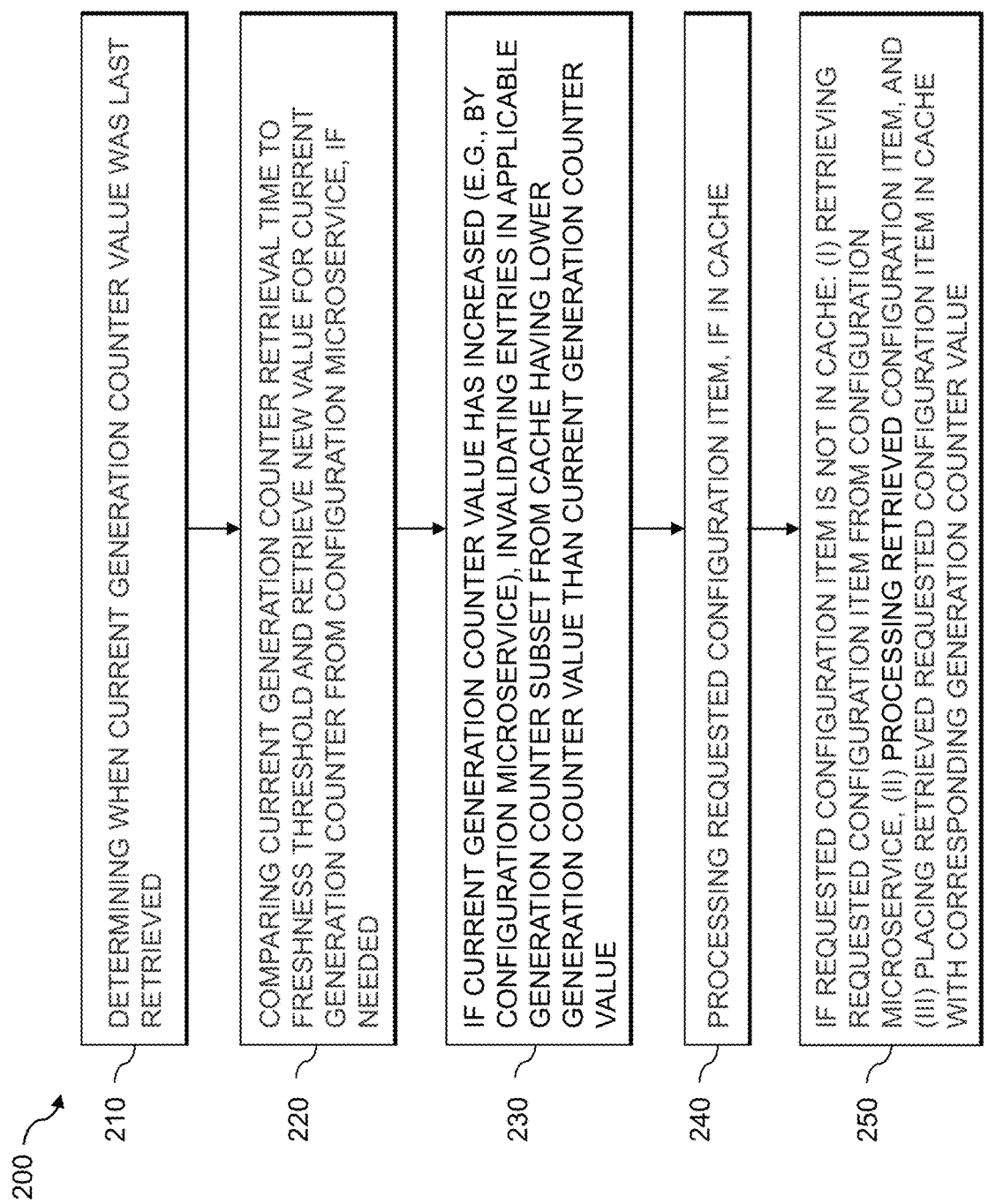
FIG. 2 is a flow chart illustrating an exemplary implementation of a consumer microservice configuration item retrieval process, according to one embodiment of the disclosure.

FIG. 2 is a flow chart illustrating an exemplary implementation of a consumer microservice configuration item retrieval process 200, according to one embodiment of the disclosure. As shown in FIG. 2, the exemplary consumer microservice configuration item retrieval process 200 initially determines during step 210 when the current generation counter value was last retrieved (for example, in response to a new request for a configuration item or another predefined event, or on a schedule generally related to the freshness requirements described herein).

The current generation counter retrieval time is then compared during step 220 to a freshness threshold and a new value for the current generation counter is retrieved from the generation counter retrieval endpoint 114 of the configuration microservice server 105, if needed. If it is determined during step 230 that the current generation counter value has increased (e.g., by the generation counter maintenance module 112 of the configuration microservice server 105), entries in the applicable generation counter subset are invalidated from the cache 170 having a lower generation counter value than the current generation counter value.

The requested configuration item is then processed during step 240, if the requested configuration item resides in cache. If it is determined during step 250 that the requested configuration item is not in the cache, however: (i) the requested configuration item is retrieved from the configuration microservice server 105 (for example, by the configuration item retrieval module 160 from the configuration item retrieval endpoint 116), (ii) the retrieved configuration item is processed by the consumer microservice server 155, and (iii) the retrieved requested configuration item is placed in the cache 170 with the corresponding generation counter value returned by the configuration item retrieval endpoint 116.

The exemplary consumer microservice configuration item retrieval process 200 of FIG. 2 can be extended to accommodate a retrieval of more generic data items, based on the present disclosure, as would be apparent to a person of ordinary skill in the art.

Figure 3:
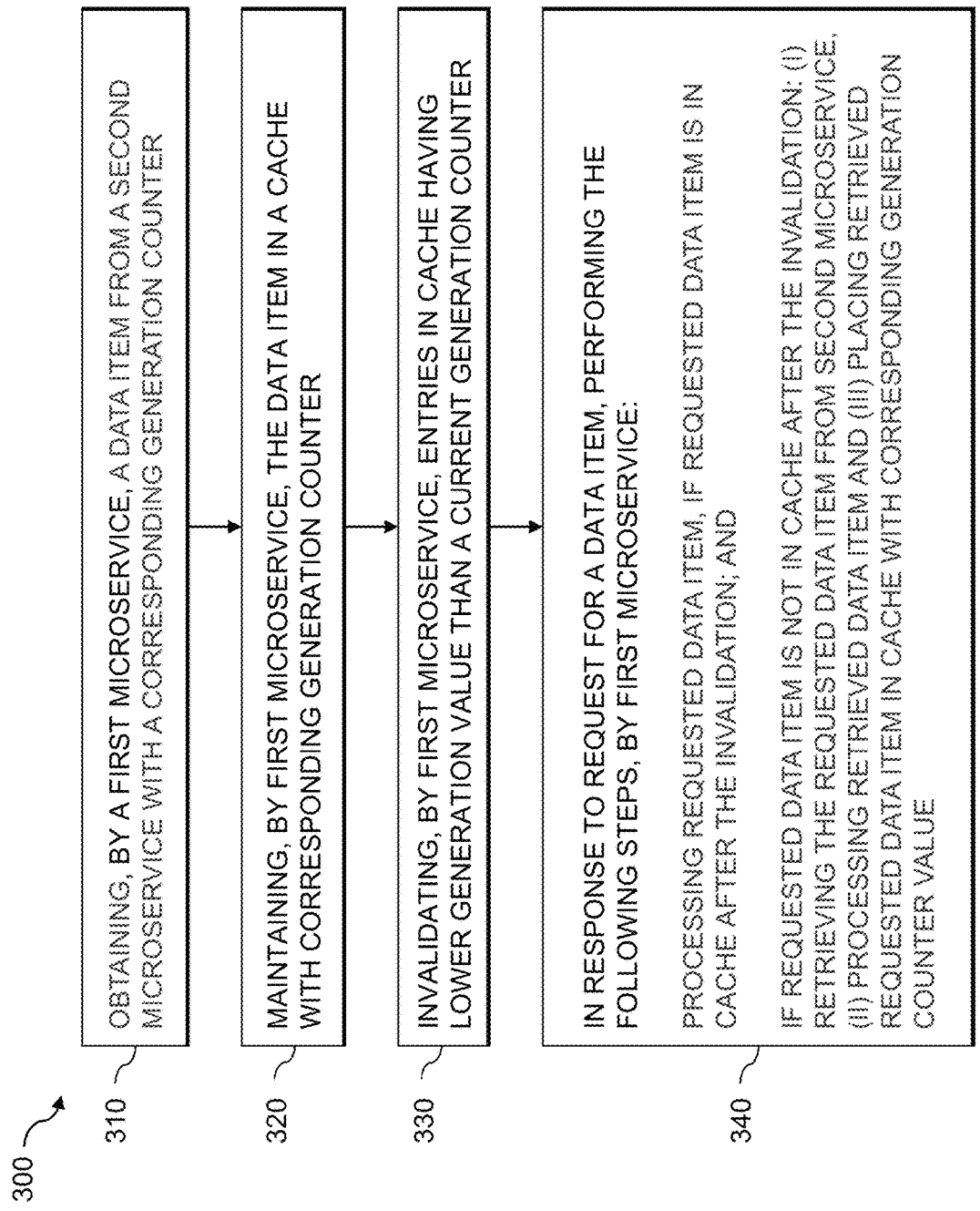
FIG. 3 is a flow chart illustrating an exemplary implementation of a consumer microservice configuration item retrieval process, according to at least one embodiment.

FIG. 3 is a flow chart illustrating an exemplary implementation of a consumer microservice data item retrieval process 300, according to one embodiment of the disclosure. As shown in FIG. 3, the exemplary consumer microservice data item retrieval process 300 initially obtains, by a first microservice, a data item from a second microservice with a corresponding generation counter during step 310. During step 320, the exemplary consumer microservice data item retrieval process 300 maintains, by the first microservice, the data item in a cache with a corresponding generation counter. The first microservice invalidates entries in the cache 170 during step 330 having a lower generation counter value than a current generation counter.

During step 340, in response to a request for a data item, the following steps are performed by the first microservice: processing the requested data item, if the requested data item is in the cache 170 after the invalidation; and if the requested data item is not in the cache 170 after the invalidation: (i) retrieving the requested data item from the second microservice, (ii) processing the retrieved data item and (iii) placing the retrieved requested data item in the cache 170 with the corresponding generation counter value.

In other embodiments, the consumer microservice configuration item retrieval process 200 and/or the consumer microservice data item retrieval process 300 can perform the sequence of actions in a different order. In yet another embodiment, these processes 200, 300 can skip one or more of the actions. In other aspects, one or more of the actions are performed simultaneously. In some aspects, additional actions can be performed. Thus, the particular processing operations and other network functionality described in conjunction with the diagrams of FIGS. 2 and 3 are presented by way of illustrative example only, and should not be construed as limiting the scope of the disclosure in any way.

Among other benefits, the disclosed microservice configuration information retrieval and storage techniques improve the efficiency and utility of a cache that stores configuration items in a microservice environment.

One or more embodiments of the disclosure provide improved methods, apparatus and computer program products for microservice configuration information retrieval and storage. The foregoing applications and associated embodiments should be considered as illustrative only, and numerous other embodiments can be configured using the techniques disclosed herein, in a wide variety of different applications.

It should also be understood that the disclosed generation-based configuration item caching techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for microservice configuration information retrieval and storage may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based configuration information retrieval and storage engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based configuration information retrieval and storage platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. These platforms may also be used to implement at least portions of other information processing systems in other embodiments.

Figure 4:
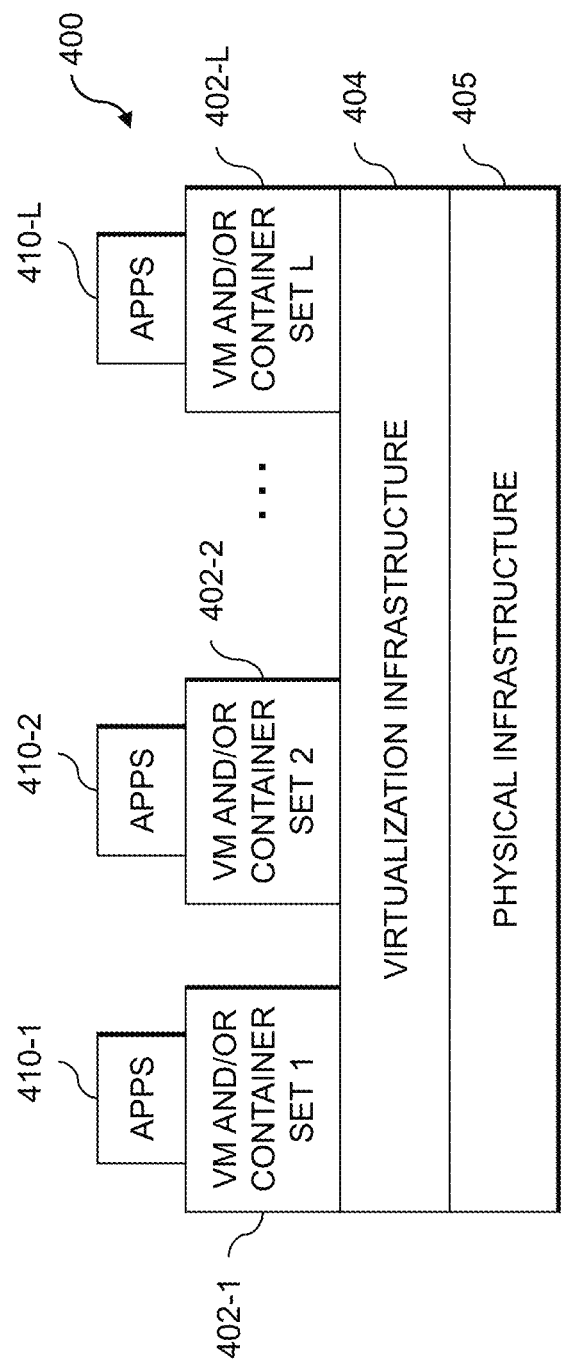
FIG. 4 illustrates an exemplary processing platform that may be used to implement at least a portion of one or more embodiments of the disclosure comprising a cloud infrastructure.

FIG. 4 shows an example processing platform comprising cloud infrastructure 400. The cloud infrastructure 400 comprises a combination of physical and virtual processing resources that may be utilized to implement at least a portion of the disclosed information processing systems. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide configuration information retrieval and storage functionality of the type described above for one or more processes running on a given one of the VMs. For example, each of the VMs can implement configuration information retrieval and storage control logic and associated generation counter values for providing generation-based configuration item caching functionality for one or more processes running on that particular VM.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide configuration information retrieval and storage functionality of the type described above for one or more processes running on different ones of the containers. For example, a container host device supporting multiple containers of one or more container sets can implement one or more instances of configuration information retrieval and storage control logic and associated generation counter values for use in providing generation-based configuration item caching.

As is apparent from the above, one or more of the processing modules or other components of computer network 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises at least a portion of the given system and includes a plurality of processing devices, denoted 502-1, 502-2, 502-3, . . . 502-K, which communicate with one another over a network 504. The network 504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 502-1 in the processing platform 500 comprises a processor 510 coupled to a memory 512. The processor 510 may comprise a microprocessor, a microcontroller, an application specific integrated circuit (ASIC), a field programmable gate array (FPGA) or other type of processing circuitry, as well as portions or combinations of such circuitry elements, and the memory 512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the given system may include additional or alternative processing platforms, as well as numerous distinct processing platforms in any combination, with each such platform comprising one or more computers, storage devices or other processing devices.

Multiple elements of an information processing system may be collectively implemented on a common processing platform of the type shown in FIG. 4 or 5, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, by a first microservice of a software application, at least one data item, from a second microservice of the software application, with a corresponding generation counter for a plurality of data items comprising the at least one data item, wherein the generation counter comprises a value that is incremented for each update of the plurality of data items, wherein the obtaining comprises the first microservice issuing a remote call to the second microservice to retrieve the at least one data item, wherein the first microservice comprises a consumer microservice and the second microservice comprises a supplier microservice that manages the at least one data item needed by the first microservice to perform one or more tasks, wherein the obtaining the at least one data item comprises obtaining a first subset of the plurality of data items with the corresponding generation counter for the plurality of data items and wherein the generation counter value is incremented for each update to one or more data items in the first subset of the plurality of data items;

maintaining, by the first microservice, each data item in the first subset of the plurality of data items in a cache of the first microservice, when the first subset of the plurality of data items is obtained with a respective copy of the corresponding generation counter for the plurality of data items;

invalidating, by the first microservice, one or more entries in the cache having a lower generation counter value than a current generation counter provided by the second microservice, wherein the invalidating the one or more entries in the cache having the lower generation counter value than the current generation counter comprises invalidating a second subset of the data items within the first subset of the plurality of data items comprising the at least one data item; and in response to a request for the at least one data item, performing the following steps, by the first microservice:

processing the requested at least one data item, if the requested at least one data item is in the cache after the invalidation; and if the requested at least one data item is not in the cache after the invalidation: (i) retrieving the requested at least one data item from the second microservice, (ii) processing the retrieved at least one data item and (iii) placing the retrieved at least one requested data item in the cache with a corresponding generation counter value from the second microservice;

wherein the method is performed by at least one processing device comprising a processor coupled to a memory.

2. The method of claim 1, wherein the second microservice comprises a data item retrieval endpoint to retrieve the at least one data item in response to the first microservice retrieving the requested at least one data item from the second microservice.

3. The method of claim 2, wherein the data item retrieval endpoint provides each data item in the at least one data item to the first microservice with the corresponding generation counter value.

4. The method of claim 1, wherein the second microservice increments the generation counter for each update to the plurality of data items comprising the at least one data item.

5. The method of claim 1, wherein the invalidating further comprises obtaining the current generation counter from a generation counter retrieval endpoint of the second microservice.

6. The method of claim 1, wherein the invalidating one or more entries in the cache having the lower generation counter value than the current generation counter further comprises evaluating a retrieval time of the current generation counter with respect to one or more freshness criteria and updating the current generation counter responsive to the one or more freshness criteria not being satisfied.

7. The method of claim 1, wherein the plurality of data items comprises a plurality of configuration data items.

8. The method of claim 1, wherein the plurality of data items comprises one or more of data objects and data lists.

9. An apparatus comprising:
at least one processing device comprising a processor coupled to a memory;
the at least one processing device being configured to implement the following steps:
obtaining, by a first microservice of a software application, at least one data item, from a second microservice of the software application, with a corresponding generation counter for a plurality of data items comprising the at least one data item, wherein the generation counter comprises a value that is incremented for each update of the plurality of data items, wherein the obtaining comprises the first microservice issuing a remote call to the second microservice to retrieve the at least one data item, wherein the first microservice comprises a consumer microservice and the second microservice comprises a supplier microservice that manages the at least one data item needed by the first microservice to perform one or more tasks, wherein the obtaining the at least one data item comprises obtaining a first subset of the plurality of data items with the corresponding generation counter for the plurality of data items and wherein the generation counter value is incremented for each update to one or more data items in the first subset of the plurality of data items;

maintaining, by the first microservice, each data item in the first subset of the plurality of data items in a cache of the first microservice, when the first subset of the plurality of data items is obtained with a respective copy of the corresponding generation counter for the plurality of data items;

invalidating, by the first microservice, one or more entries in the cache having a lower generation counter value than a current generation counter provided by the second microservice, wherein the invalidating the one or more entries in the cache having the lower generation counter value than the current generation counter comprises invalidating a second subset of the data items within the first subset of the plurality of data items comprising the at least one data item; and in response to a request for the at least one data item, performing the following steps, by the first microservice:

processing the requested at least one data item, if the requested at least one data item is in the cache after the invalidation; and if the requested at least one data item is not in the cache after the invalidation: (i) retrieving the requested at least one data item from the second microservice, (ii) processing the retrieved at least one data item and (iii) placing the retrieved at least one requested data item in the cache with a corresponding generation counter value from the second microservice.

10. The apparatus of claim 9, wherein the second microservice comprises a data item retrieval endpoint to retrieve the at least one data item in response to the first microservice retrieving the requested at least one data item from the second microservice.

11. The apparatus of claim 10, wherein the data item retrieval endpoint provides each data item in the at least one data item to the first microservice with the corresponding generation counter value.

12. The apparatus of claim 9, wherein the second microservice increments the generation counter for each update to the plurality of data items comprising the at least one data item.

13. The apparatus of claim 9, wherein the invalidating further comprises obtaining the current generation counter from a generation counter retrieval endpoint of the second microservice.

14. The apparatus of claim 9, wherein the invalidating one or more entries in the cache having the lower generation counter value than the current generation counter further comprises evaluating a retrieval time of the current generation counter with respect to one or more freshness criteria and updating the current generation counter responsive to the one or more freshness criteria not being satisfied.

15. A non-transitory processor-readable storage medium having stored therein program code of one or more software programs, wherein the program code when executed by at least one processing device causes the at least one processing device to perform the following steps:

obtaining, by a first microservice of a software application, at least one data item, from a second microservice of the software application, with a corresponding generation counter for a plurality of data items comprising the at least one data item, wherein the generation counter comprises a value that is incremented for each update of the plurality of data items, wherein the obtaining comprises the first microservice issuing a remote call to the second microservice to retrieve the at least one data item, wherein the first microservice comprises a consumer microservice and the second microservice comprises a supplier microservice that manages the at least one data item needed by the first microservice to perform one or more tasks, wherein the obtaining the at least one data item comprises obtaining a first subset of the plurality of data items with the corresponding generation counter for the plurality of data items and wherein the generation counter value is incremented for each update to one or more data items in the first subset of the plurality of data items;

maintaining, by the first microservice, each data item in the first subset of the plurality of data items in a cache of the first microservice, when the first subset of the plurality of data items is obtained with a respective copy of the corresponding generation counter for the plurality of data items;

invalidating, by the first microservice, one or more entries in the cache having a lower generation counter value than a current generation counter provided by the second microservice, wherein the invalidating the one or more entries in the cache having the lower generation counter value than the current generation counter comprises invalidating a second subset of the data items within the first subset of the plurality of data items comprising the at least one data item; and in response to a request for the at least one data item, performing the following steps, by the first microservice:

processing the requested at least one data item, if the requested at least one data item is in the cache after the invalidation; and if the requested at least one data item is not in the cache after the invalidation: (i) retrieving the requested at least one data item from the second microservice, (ii) processing the retrieved at least one data item and (iii) placing the retrieved at least one requested data item in the cache with a corresponding generation counter value from the second microservice.

16. The non-transitory processor-readable storage medium of claim 15, wherein the second microservice comprises a data item retrieval endpoint to retrieve the at least one data item in response to the first microservice retrieving the requested at least one data item from the second microservice.

17. The non-transitory processor-readable storage medium of claim 16, wherein the data item retrieval endpoint provides each data item in the at least one data item to the first microservice with the corresponding generation counter value.

18. The non-transitory processor-readable storage medium of claim 15, wherein the second microservice increments the generation counter for each update to the plurality of data items comprising the at least one data item.

19. The non-transitory processor-readable storage medium of claim 15, wherein the invalidating further comprises obtaining the current generation counter from a generation counter retrieval endpoint of the second microservice.

20. The non-transitory processor-readable storage medium of claim 15, wherein the invalidating further comprises evaluating a retrieval time of the current generation counter with respect to one or more freshness criteria and updating the current generation counter responsive to the one or more freshness criteria not being satisfied.

* * * * *